(12) United States Patent
Kline et al.

(10) Patent No.: US 11,784,821 B2
(45) Date of Patent: Oct. 10, 2023

(54) COGNITIVE PROCESS DATA AND DECISION TRACKING TO FACILITATE ARTIFICIAL INTELLIGENCE OPERATIONS COMPLIANCE

(71) Applicant: INTERNATIONAL BUSINESS MACHINES CORPORATION, Armonk, NY (US)

(72) Inventors: Eric V. Kline, Pine Island, MN (US); Sarbajit K. Rakshit, Kolkata (IN)

(73) Assignee: International Business Machines Corporation, Armonk, NY (US)

( * ) Notice: Subject to any disclaimer, the term of this patent is extended or adjusted under 35 U.S.C. 154(b) by 659 days.

(21) Appl. No.: 16/815,041

(22) Filed: Mar. 11, 2020

(65) Prior Publication Data

US 2021/0287043 A1    Sep. 16, 2021

(51) Int. Cl.
*H04L 9/32* (2006.01)
*G06F 16/21* (2019.01)
*H04L 9/06* (2006.01)
*G06N 5/04* (2023.01)
*G06F 18/214* (2023.01)
*G06F 18/245* (2023.01)
*H04L 9/00* (2022.01)

(52) U.S. Cl.
CPC .......... *H04L 9/3239* (2013.01); *G06F 16/219* (2019.01); *G06F 18/2148* (2023.01); *G06F 18/245* (2023.01); *G06N 5/04* (2013.01); *H04L 9/0643* (2013.01); *H04L 9/50* (2022.05)

(58) Field of Classification Search
CPC .. G06K 9/6257; G06K 9/6285; G06K 9/6227; G06F 16/219; G06N 5/04; G06N 20/00; H04L 9/0643; H04L 9/50; H04L 9/3239; H04L 63/123
See application file for complete search history.

(56) References Cited

U.S. PATENT DOCUMENTS

| | | | |
|---|---|---|---|
| 9,019,381 B2 | 4/2015 | Guler et al. | |
| 2018/0189797 A1 | 7/2018 | Ravi | |
| 2018/0268491 A1 | 9/2018 | Cuomo et al. | |
| 2019/0180244 A1* | 6/2019 | El Kharzazi | G06Q 10/105 |

FOREIGN PATENT DOCUMENTS

| | | |
|---|---|---|
| CN | 110059955 A | 7/2019 |
| KR | 101964733 B1 | 4/2019 |
| WO | 2019049160 A1 | 3/2019 |

OTHER PUBLICATIONS

Stach, C., Giebler, C., Wagner, M., Weber, C. and Mitschang, B., 2020. Amnesia: A Technical Solution towards GDPR-compliant Machine Learning. In ICISSP (pp. 21-32).*

(Continued)

*Primary Examiner* — Zhitong Chen
(74) *Attorney, Agent, or Firm* — CANTOR COLBURN LLP; Tihon Poltavets

(57) ABSTRACT

Aspects of the invention include obtaining an artificial intelligence decision model and receiving a plurality of inputs. Aspects also include executing the artificial intelligence decision model based on the plurality of inputs and recording, in a ledger, a result of the execution of the artificial intelligence decision model, the plurality of inputs, and an identifier of the artificial intelligence decision model.

14 Claims, 6 Drawing Sheets

340

| | 352 | 354 | 356 | 358 | 360 | 362 | 363 | 364 |
|---|---|---|---|---|---|---|---|---|
| | AI model version used | Source of input data | Data types in input data | Data values | Date of execution of AI model | Compliance Verification | Compliance Criteria | Result of AI decision |
| 350 | 123.2 | UK | Zip code, Gender, Credit Score | XXXXX | 2/5/2020 | Y | GDPR 2016/679 | Positive |
| | 123.2 | DE | Credit history, Credit Score | XXXXX | 2/5/2020 | Y | Title VII | Negative |
| | 111.1 | US | Gender, Credit Score, Employment status | XXXXX | 2/6/2020 | N – operator over-ride | Corp. Policy ## | 85 |

(56) References Cited

OTHER PUBLICATIONS

Kuner, C., 2010. Regulation of transborder data flows under data protection and privacy law: past, present, and future. TILT Law & Technology Working Paper, (016).*

Bertino, Elisa "Data Transparency with Blockchain and AI Ethids", Abstract Only, Journal of Data and Information Quality (JDIQ), Article No. 16; retrieved at: https://doi.org/10.1145/3312750; Aug. 2019; 6 pgs.

Dickson, Ben "Artificial Intelligence has to deal with its transparency problems", TNW; retrieved at: https://thenextweb.com/artificial-intelligence/2017/04/23/artificial-intelligence-has-to-deal-with-its-transparency-problems/; dated Apr. 23, 2017; 4 pgs.

Hosanagar, Kartik et al. "We Need Transparency in Algorithms, but Too Much Can Backfire", retrieved at: https://hbr.org/2018/07/we-need-transparency-in-algorithms-but-too-much-can-backfire; Dated Jul. 23, 2018; updated Jul. 25, 2018; 6 pgs.

Leopold, George "IBM Seeks Transparency into AI Decision Making", Enterprise AI; retrieved at https://www.enterprisetech.com/2018/12/14/ibm-seeks-to-hold-ai-accountable/; dated Dec. 14, 2018; 3 pgs.

Mell, Peter et al. "The NIST Definition of Cloud Computing—Recommendations of the National Institute of Standards and Technology" U.S. Department of Commerce, Special Publication 800-145; 7 pgs.

Nanalyze "Artificial, Intelligence and Transparency", retrieved at: https://www.nanalyze.com/2018/07/artificial-intelligence-transparency/; pubished: Jul. 23, 2018; 5 pgs.

* cited by examiner

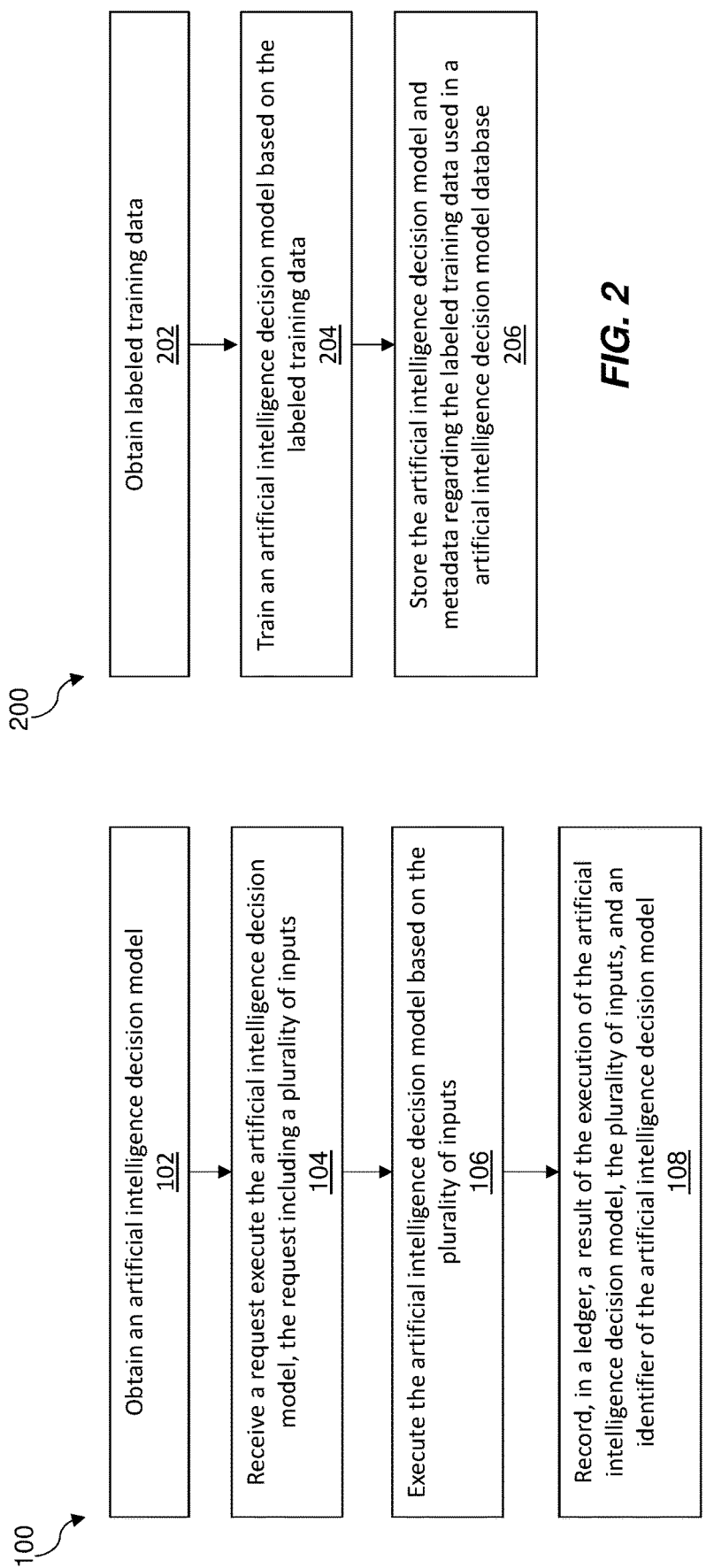

| AI model version | Source of training data | Data types in training data set | Date AI model was trained |
|---|---|---|---|
| 123.1 | USA | Employment status, Credit Score | 2/1/2019 |
| 123.2 | USA, EU | Gender, Credit Score | 11/1/2020 |

*FIG. 3A*

COGNITIVE PROCESS DATA AND DECISION TRACKING TO FACILITATE ARTIFICIAL INTELLIGENCE OPERATIONS COMPLIANCE

BACKGROUND

The present invention generally relates to artificial intelligence operations, and more specifically, to cognitive process data and decision tracking to facilitate artificial intelligence operations compliance.

Artificial intelligence (AI) is increasingly being used as a decision-making tool across a wide variety of business applications. The decisions made by an AI system are based, at least in part, on how the AI system was trained. As a result, if a biased dataset was used to train an AI system, then the decision will also be biased. Regulations, such as the General Data Protection Regulation, provide limits on the type of data that can be considered in the AI system or part of the decision making process. Furthermore, corporations may also have internal guidelines that restrict the types of data that can be considered in the AI system or part of the decision-making process.

SUMMARY

Embodiments of the present invention are directed to decision tracking to facilitate artificial intelligence operations compliance. A non-limiting example computer-implemented method includes obtaining an artificial intelligence decision model and receiving a plurality of inputs. The method also includes executing the artificial intelligence decision model based on the plurality of inputs and recording, in a ledger, a result of the execution of the artificial intelligence decision model, the plurality of inputs, and an identifier of the artificial intelligence decision model.

Other embodiments of the present invention implement features of the above-described method in computer systems and computer program products.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

FIG. 1 depicts a flow diagram of a method for decision tracking to facilitate artificial intelligence operations compliance according to one or more embodiments of the present invention;

FIG. 2 depicts a flow diagram of a method for creating an artificial intelligence decision model database according to one or more embodiments of the present invention;

FIG. 3A depicts a block diagram of an artificial intelligence decision model database according to one or more embodiments of the present invention;

Figure 3B:
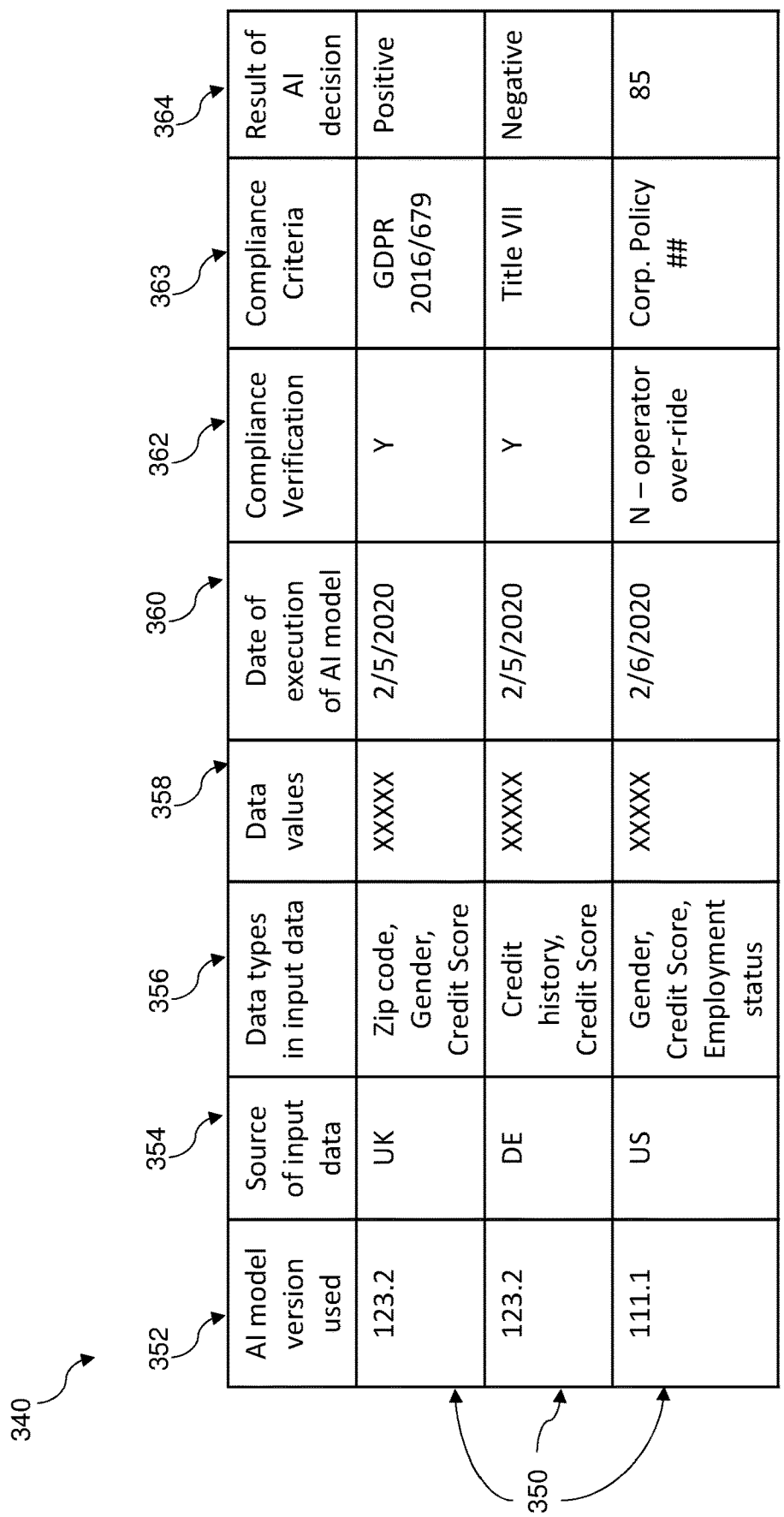
FIG. 3B depicts a block diagram of a ledger for storing intelligence decision model decision data according to one or more embodiments of the present invention.

The diagrams depicted herein are illustrative. There can be many variations to the diagrams, or the operations described therein without departing from the spirit of the invention. For instance, the actions can be performed in a differing order or actions can be added, deleted or modified. Also, the term "coupled", and variations thereof describes having a communications path between two elements and does not imply a direct connection between the elements with no intervening elements/connections between them. All of these variations are considered a part of the specification.

DETAILED DESCRIPTION

One or more embodiments of the present invention provide methods, systems, and computer program products for decision tracking to facilitate artificial intelligence (AI) operations compliance. In accordance with one or more embodiments of the present invention, a ledger is used to store data that is used by an AI decision model each time that a decision is made by the AI decision model. The stored data includes inputs provided to the AI decision model, such as data types, data values, a source of the data and the like. The ledger also includes an identifier of the AI decision model that was used to make the AI decision. In exemplary embodiments, an AI decision model database is used to track the types, sources, and values of data that are used to create and train each AI decision model. In exemplary embodiments, the ledger and AI decision model database are used to ensure compliance with data protection regulations and data protection policies and to provide an AI decision process that is end-to-end auditable for compliance.

Turning now to FIG. 1, a flow diagram of a method 100 for decision tracking to facilitate artificial intelligence operations compliance is generally shown in accordance with one or more embodiments of the present invention. The method 100 shown in FIG. 1 may be executed by an operating system, such as OS 611 of FIG. 6, executing on a computer processor. The computer processor can be a standalone processor or a node in a cloud, such as node 10 in FIG. 4.

As shown at block 102, the method 100 includes obtaining an artificial intelligence decision model. Next, as shown at block 104, the method 100 includes receiving a request to execute the artificial intelligence decision model, the request including a plurality of inputs. In exemplary embodiments, each of the plurality of inputs includes a data value and a data type and optionally a source of the data. The source of the data can include what country the data is obtained from. The method 100 also includes executing the artificial intelligence decision model based on the plurality of inputs, as shown at block 106. Next, as shown at block 108, the method 100 includes recording, in a ledger, a result of the execution of the artificial intelligence decision model, the plurality of inputs, and an identifier of the artificial intelligence decision model that was used to make the decision. In exemplary embodiments, the ledger is stored as a distributed ledger that utilizes blockchain.

In exemplary embodiments, the identifier of the artificial intelligence decision model indicates a version of the artificial intelligence decision model used in the execution. In one embodiment, the identifier of the artificial intelligence decision model is a primary key of an artificial intelligence decision model database that is used to store data regarding multiple artificial intelligence decision models. In exemplary embodiments, each entry in the artificial intelligence decision model database also includes a source of data used to train the artificial intelligence decision model and the types of data that were used to train the artificial intelligence decision model.

Turning now to FIG. 2, a flow diagram of a method 200 for training an artificial intelligence decision model is generally shown in accordance with one or more embodiments of the present invention. The method 200 shown in FIG. 2 may be executed by an operating system, such as OS 611 of FIG. 6, executing on a computer processor. The computer processor can be a standalone processor or a node in a cloud, such as node 10 in FIG. 4.

As shown at block 202, the method 200 includes obtaining labeled training data. In exemplary embodiments, the labeled training data is a large dataset that includes a plurality of data values and metadata, such as a data type, a source of the data, and the like, for each of the plurality of data values. Next, as shown at block 204, the method 200 includes training an artificial intelligence decision model based on the labeled training data. The method 200 concludes at block 206 by storing the artificial intelligence decision model and metadata regarding the labeled training data used in an artificial intelligence decision model database The flow diagrams of FIGS. 1 and 2 are not intended to indicate that the operations of methods 100, 200 are to be executed in any particular order, or that all of the operations of methods 100, 200 are to be included in every case. Additionally, methods 100, 200 can include any suitable number of additional operations.

Turning now to FIG. 3A, a block diagram of an artificial intelligence decision model database 300 according to one or more embodiments of the present invention is shown. As illustrated, the AI decision model database 300 includes a plurality of entries 310 that each correspond to different AI decision models. Each entry 310 in the AI decision model database 300 includes an AI model version 302, a source of the training data 304 that was used to train the AI decision model, the data types 306 in the training data set, and the date that the AI decision model was trained. In exemplary embodiments, other data regarding the AI decision model is stored in the AI decision model database 300.

Referring now to FIG. 3B, a block diagram of a ledger 340 for storing intelligence decision model decision data according to one or more embodiments of the present invention is shown. As illustrated, the ledger 340 includes a plurality of entries 350 that each correspond to decisions made by an AI decision model. Each entry 350 includes an AI model version 352, a source of input data 354, one or more data types in the input data 356, data values 358, the date of execution of the AI model, compliance verification 362, compliance criteria 363, and the result of the AI decision 364. In exemplary embodiments, other data regarding the inputs to, and the decision made by, the AI decision model is stored in the ledger 340.

In one embodiment, the source of input data 354 is used to indicate a geographical source of the input data provided to the AI decision model, such as the country and/or state that the input data was obtained from. In one embodiment, the result of the AI decision 364 is a binary decision such as a pass/fail or positive/negative response. In another embodiment, the result of the AI decision 364 is a numeric value.

In exemplary embodiments, the ledger 340 utilizes the compliance verification 362 field to store information regarding compliance checks that are performed when an AI decision is made. In addition, the ledger 340 utilizes the compliance criteria 363 field to store information regarding the criteria applied during the compliance checks. In exemplary embodiments, the compliance criteria include one or more of a regulatory compliance check and an internal compliance check. A regulatory compliance check is a verification that the data used in making an AI decision does not include any types of data, either as direct inputs or as training data, that are prohibited by law. In one embodiment, a regulatory compliance check includes verifying compliance with one or more criteria that are determined at least in part based on a geographical source of the plurality of inputs. An internal compliance check is a verification that the data used in making an AI decision does not include any types of data, either as direct inputs or as training data, that are prohibited by one or more policies of a company that will utilize the decision of the AI decision model. In exemplary embodiments, a separate database is used to track and store the compliance criteria 363 in a manner similar to the AI decision model database 300. Accordingly, revisions to the compliance criteria 363 that occur over time can be tracked and used for audit purposes.

In some embodiments, cases of partial non-compliance can occur. In one example, partial non-compliance can occur when compliance with jurisdictional rules is met but not internal compliance rules, or visa versa. In exemplary embodiments, all instances of non-compliance within the ledger 360 must be resolved, resolution may include a human over-ride or waiver, or other remedial actions to get into compliance.

In exemplary embodiments, the AI decision model database 300 includes multiple versions of similar AI decision models that have been trained with data sets that include different data types. The data types used to train the various versions of the AI decision models are determined based upon data protection regulations of the source of the input data used to train the AI decision model. Accordingly, when an AI decision model is selected to make an AI decision, the AI decision model is selected based on the desired data types to ensure regulatory and internal compliance.

In exemplary embodiments, a ledger is configured to track and maintain metadata associated with each input data-point at each step during an AI based decision-making process. As a result, the ledger can be used to audit the AI based decision-making process. For example, if a company or user needs to validate compliance with data protection regulations to a government entity.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 4:
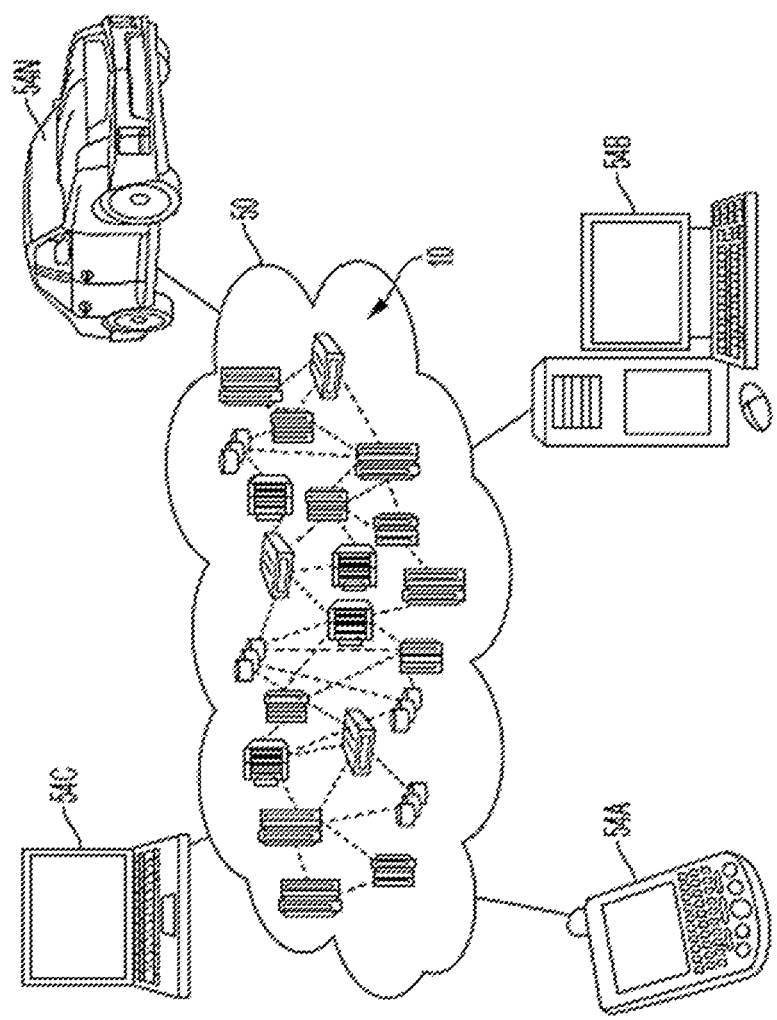
FIG. 4 depicts a cloud computing environment according to one or more embodiments of the present invention.

Referring now to FIG. 4, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 4 are intended to be illustrative only and that computing nodes 10 and cloud computing environment 50 can communicate with any type of computerized device over any type of network and/or network addressable connection (e.g., using a web browser).

Figure 5:
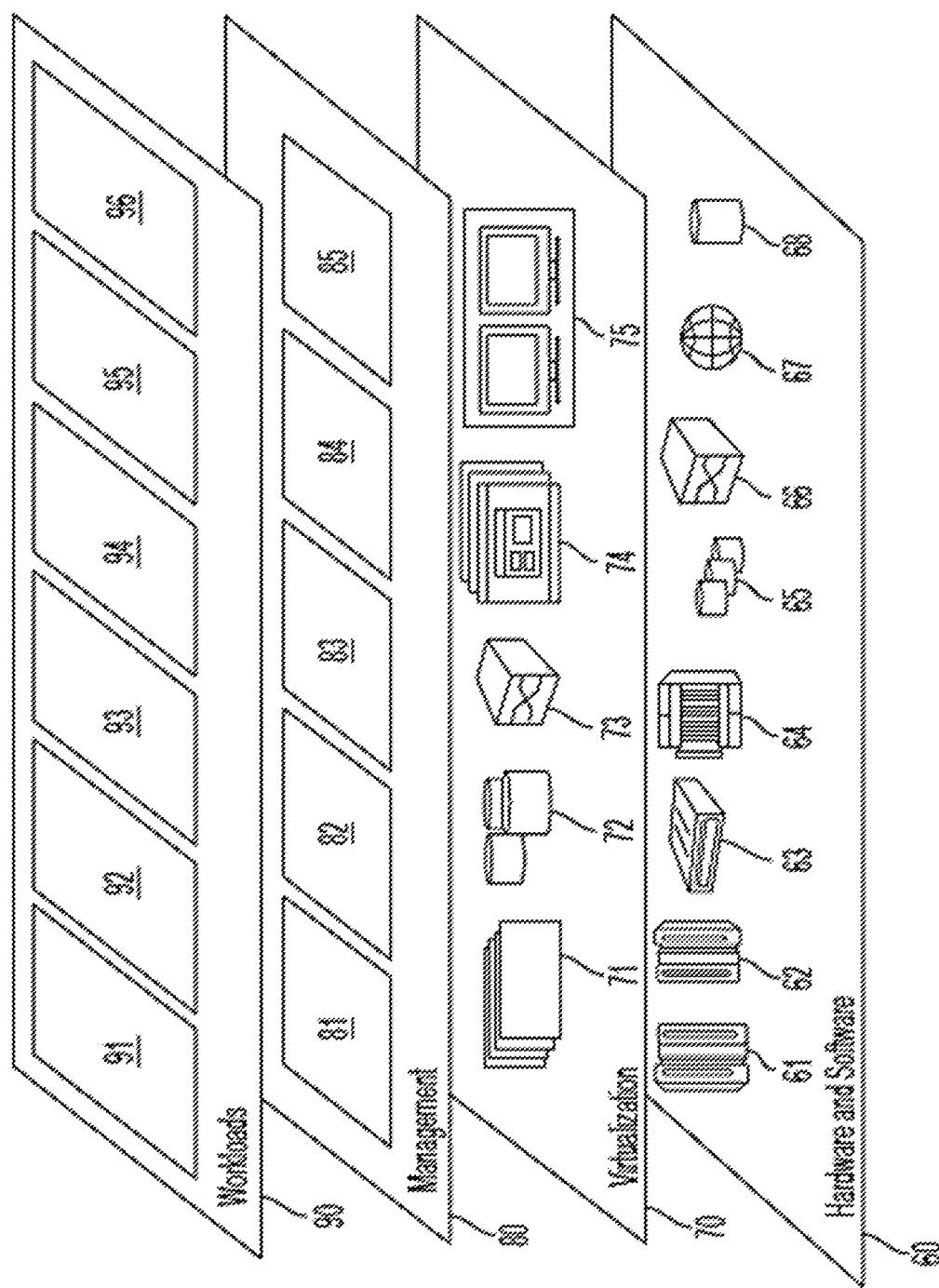
FIG. 5 depicts abstraction model layers according to one or more embodiments of the present invention.

Referring now to FIG. 5, a set of functional abstraction layers provided by cloud computing environment 50 (FIG. 4) is shown. It should be understood in advance that the components, layers, and functions shown in FIG. 5 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and decision tracking to facilitate artificial intelligence operations compliance 96.

It is understood that one or more embodiments of the present invention are capable of being implemented in conjunction with any type of computing environment now known or later developed.

Figure 6:
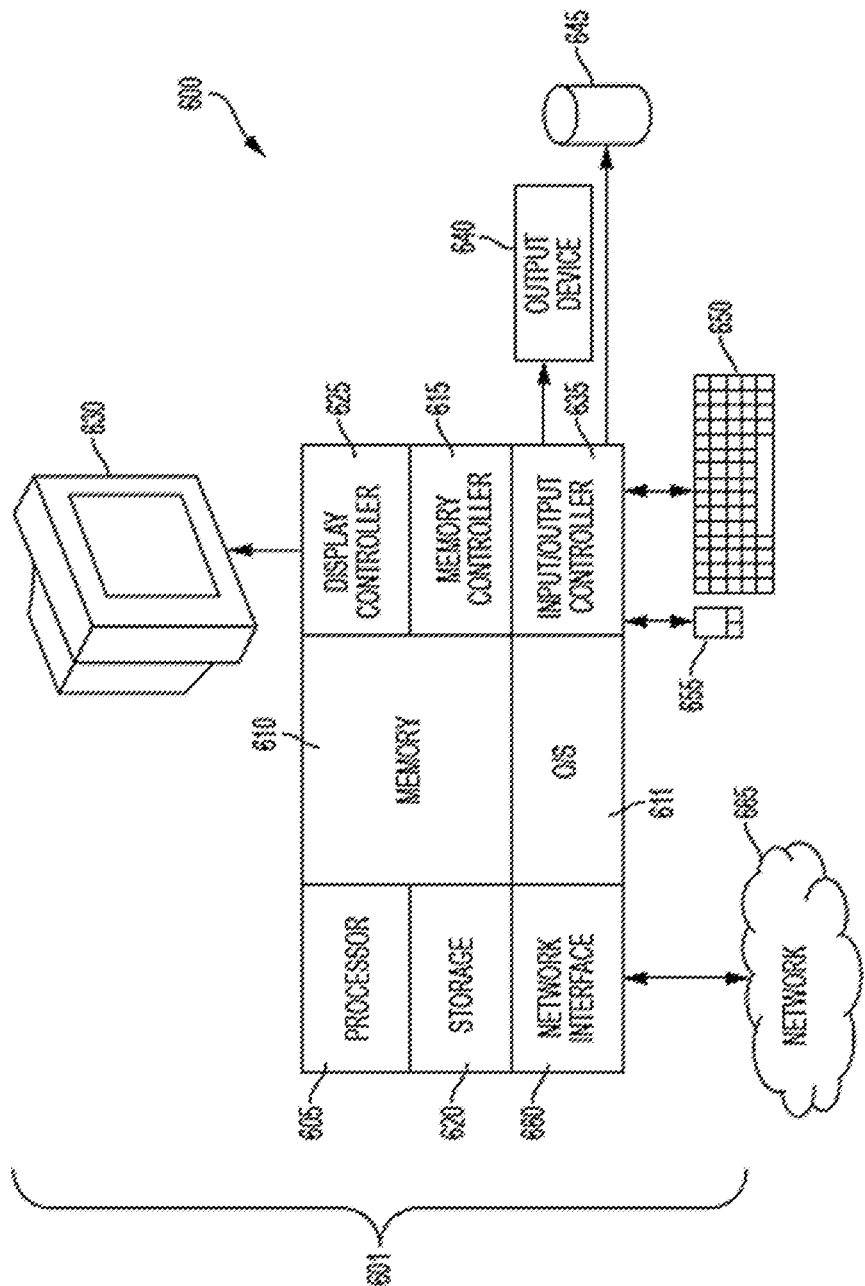
FIG. 6 illustrates a processing system for cognitive process data and decision tracking to facilitate artificial intelligence operations compliance according to one or more embodiments of the present invention.

Turning now to FIG. 6, a computer system for buffer overflow trapping is generally shown in accordance with one or more embodiments of the present invention. The methods described herein can be implemented in hardware, software (e.g., firmware), or a combination thereof. In one or more exemplary embodiments of the present invention, the methods described herein are implemented in hardware as part of the microprocessor of a special or general-purpose digital computer, such as a personal computer, workstation, minicomputer, or mainframe computer. The system 600 therefore may include general-purpose computer or mainframe 601 capable of running multiple instances of an O/S simultaneously.

In one or more exemplary embodiments of the present invention, in terms of hardware architecture, as shown in FIG. 6, the computer 601 includes one or more processors 605, memory 610 coupled to a memory controller 615, and one or more input and/or output (I/O) devices 640, 645 (or peripherals) that are communicatively coupled via a local input/output controller 635. The input/output controller 635 can be, for example but not limited to, one or more buses or other wired or wireless connections, as is known in the art. The input/output controller 635 may have additional elements, which are omitted for simplicity, such as controllers, buffers (caches), drivers, repeaters, and receivers, to enable communications. Further, the local interface may include address, control, and/or data connections to enable appropriate communications among the aforementioned components. The input/output controller 635 may include a plurality of sub-channels configured to access the output devices 640 and 645. The sub-channels may include fiber-optic communications ports.

The processor 605 is a hardware device for executing software, particularly that stored in storage 620, such as cache storage, or memory 610. The processor 605 can be any custom made or commercially available processor, a central processing unit (CPU), an auxiliary processor among several processors associated with the computer 601, a semiconductor based microprocessor (in the form of a microchip or chip set), a macroprocessor, or generally any device for executing instructions.

The memory 610 can include any one or combination of volatile memory elements (e.g., random access memory (RAM, such as DRAM, SRAM, SDRAM, etc.)) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 610 may incorporate electronic, magnetic, optical, and/or other types of storage media. Note that the memory 610 can have a distributed architecture, where various components are situated remote from one another, but can be accessed by the processor 605.

The instructions in memory 610 may include one or more separate programs, each of which comprises an ordered listing of executable instructions for implementing logical functions. In the example of FIG. 6, the instructions in the memory 610 a suitable operating system (OS) 611. The operating system 611 essentially controls the execution of other computer programs and provides scheduling, input-output control, file and data management, memory management, and communication control and related services.

In accordance with one or more embodiments of the present invention, the memory 610 may include multiple logical partitions (LPARs) each running an instance of an operating system. The LPARs may be managed by a hypervisor, which may be a program stored in memory 610 and executed by the processor 605.

In one or more exemplary embodiments of the present invention, a conventional keyboard 650 and mouse 655 can be coupled to the input/output controller 635. Other output devices such as the I/O devices 640, 645 may include input devices, for example but not limited to a printer, a scanner, microphone, and the like. Finally, the I/O devices 640, 645 may further include devices that communicate both inputs and outputs, for instance but not limited to, a network interface card (NIC) or modulator/demodulator (for accessing other files, devices, systems, or a network), a radio frequency (RF) or other transceiver, a telephonic interface, a bridge, a router, and the like. The system 600 can further include a display controller 625 coupled to a display 630.

In one or more exemplary embodiments of the present invention, the system 600 can further include a network interface 660 for coupling to a network 665. The network 665 can be an IP-based network for communication between the computer 601 and any external server, client and the like via a broadband connection. The network 665 transmits and receives data between the computer 601 and external systems. In an exemplary embodiment, network 665 can be a managed IP network administered by a service provider. The network 665 may be implemented in a wireless fashion, e.g., using wireless protocols and technologies, such as WiFi, WiMax, etc. The network 665 can also be a packet-switched network such as a local area network, wide area network, metropolitan area network, Internet network, or other similar type of network environment. The network 665 may be a fixed wireless network, a wireless local area network (LAN), a wireless wide area network (WAN) a personal area network (PAN), a virtual private network (VPN), intranet or other suitable network system and includes equipment for receiving and transmitting signals.

If the computer 601 is a PC, workstation, intelligent device or the like, the instructions in the memory 610 may further include a basic input output system (BIOS) (omitted for simplicity). The BIOS is a set of essential software routines that initialize and test hardware at startup, start the OS 611, and support the transfer of data among the hardware devices. The BIOS is stored in ROM so that the BIOS can be executed when the computer 601 is activated.

When the computer 601 is in operation, the processor 605 is configured to execute instructions stored within the memory 610, to communicate data to and from the memory 610, and to generally control operations of the computer 601 pursuant to the instructions. In accordance with one or more embodiments of the present invention, computer 601 is an example of a cloud computing node 10 of FIG. 4.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

One or more of the methods described herein can be implemented with any or a combination of the following technologies, which are each well known in the art: a discreet logic circuit(s) having logic gates for implementing logic functions upon data signals, an application specific integrated circuit (ASIC) having appropriate combinational logic gates, a programmable gate array(s) (PGA), a field programmable gate array (FPGA), etc For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

In some embodiments, various functions or acts can take place at a given location and/or in connection with the operation of one or more apparatuses or systems. In some embodiments, a portion of a given function or act can be performed at a first device or location, and the remainder of the function or act can be performed at one or more additional devices or locations.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The present disclosure has been presented for purposes of illustration and description but is not intended to be exhaustive or limited to the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

The diagrams depicted herein are illustrative. There can be many variations to the diagram or the steps (or operations) described therein without departing from the spirit of the disclosure. For instance, the actions can be performed in a differing order or actions can be added, deleted or modified. Also, the term "coupled" describes having a signal path between two elements and does not imply a direct connection between the elements with no intervening elements/connections therebetween. All of these variations are considered a part of the present disclosure.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A method for decision tracking to facilitate artificial intelligence operations compliance, the method comprising:
    obtaining, by a processor, an artificial intelligence decision model;
    receiving, by the processor, a plurality of inputs, wherein each of the plurality of inputs includes a data value, a data type, and a geographical source;
    executing, via the processor, the artificial intelligence decision model based on the plurality of inputs;
    recording, in a ledger by the processor, a result of the execution of the artificial intelligence decision model, the plurality of inputs, and an identifier of the artificial intelligence decision model;

performing, via the processor, a compliance check for the execution based on a compliance criteria; and storing, via the processor in the ledger, a compliance verification indication in the ledger for the execution, wherein the compliance criteria indicate one or more data types that are not permitted to be used by the artificial intelligence decision model, wherein the compliance criteria are determined at least in part based on the geographical source of the plurality of inputs.

2. The method of claim 1, wherein the identifier of the artificial intelligence decision model indicates a version of the artificial intelligence decision model used in the execution.

3. The method of claim 2, wherein an artificial intelligence decision model database is used to store data regarding versions of the artificial intelligence decision model, wherein each entry in the artificial intelligence decision model database includes the version of the artificial intelligence decision model, a source of data used to train the artificial intelligence decision model, and a type of data used to train the artificial intelligence decision model.

4. The method of claim 1, wherein each of the plurality of inputs includes a data value and a data type.

5. The method of claim 1, wherein the ledger is stored as a distributed ledger that utilizes blockchain.

6. A system comprising:
one or more processors for executing computer-readable instructions, the computer-readable instructions controlling the one or more processors to perform operations comprising:
obtaining an artificial intelligence decision model;
receiving a plurality of inputs, wherein each of the plurality of inputs includes a data value, a data type, and a geographical source;
executing the artificial intelligence decision model based on the plurality of inputs;
recording, in a ledger, a result of the execution of the artificial intelligence decision model, the plurality of inputs, and an identifier of the artificial intelligence decision model;
performing, via the processor, a compliance check for the execution based on a compliance criteria; and
storing, via the processor in the ledger, a compliance verification indication for the execution,
wherein the compliance criteria indicate one or more data types that are not permitted to be used by the artificial intelligence decision model, wherein the compliance criteria are determined at least in part based on the geographical source of the plurality of inputs.

7. The system of claim 6, wherein the identifier of the artificial intelligence decision model indicates a version of the artificial intelligence decision model used in the execution.

8. The system of claim 7, wherein an artificial intelligence decision model database is used to store data regarding versions of the artificial intelligence decision model, wherein each entry in the artificial intelligence decision model database includes the version of the artificial intelligence decision model, a source of data used to train the artificial intelligence decision model, and a type of data used to train the artificial intelligence decision model.

9. The system of claim 6, wherein each of the plurality of inputs includes a data value and a data type.

10. The system of claim 6, wherein the ledger is stored as a distributed ledger that utilizes blockchain.

11. A computer program product comprising a computer-readable storage medium having program instructions embodied therewith, the program instructions executable by a processor to cause the processor to perform operations comprising:
obtaining an artificial intelligence decision model;
receiving a plurality of inputs, wherein each of the plurality of inputs includes a data value, a data type, and a geographical source;
executing the artificial intelligence decision model based on the plurality of inputs;
recording, in a ledger, a result of the execution of the artificial intelligence decision model, the plurality of inputs, and an identifier of the artificial intelligence decision model;
performing, via the processor, a compliance check for the execution based on a compliance criteria; and
storing, via the processor in the ledger, a compliance verification indication for the execution,
wherein the compliance criteria indicate one or more data types that are not permitted to be used by the artificial intelligence decision model, wherein the compliance criteria are determined at least in part based on the geographical source of the plurality of inputs.

12. The computer program product of claim 11, wherein the identifier of the artificial intelligence decision model indicates a version of the artificial intelligence decision model used in the execution.

13. The computer program product of claim 12, wherein an artificial intelligence decision model database is used to store data regarding versions of the artificial intelligence decision model, wherein each entry in the artificial intelligence decision model database includes the version of the artificial intelligence decision model, a source of data used to train the artificial intelligence decision model, and a type of data used to train the artificial intelligence decision model.

14. The computer program product of claim 11, wherein each of the plurality of inputs includes a data value and a data type.

* * * * *